Sept. 18, 1945.   D. C. KEMERER   2,385,083
FORMING METHODS
Filed Nov. 17, 1942

DON CHARLES KEMERER,
INVENTOR.
BY
ATTORNEY.

Patented Sept. 18, 1945

2,385,083

UNITED STATES PATENT OFFICE 2,385,083

FORMING METHOD

Don Charles Kemerer, Long Beach, Calif.

Application November 17, 1942, Serial No. 465,844

1 Claim. (Cl. 18—56)

This invention pertains to methods of obtaining plastic deformation of materials so as to form said materials into the configuration of a die in a rapid and efficient manner. The invention also pertains to methods whereby fluid pressure impulses varying rapidly in intensity are employed in forming materials into objects having the configuration of a die.

The pressing or molding of various materials into objects of a desired configuration by the use of rigid male and female dies has in recent years been supplanted by methods in which one rigid die is employed and the material to be molded or pressed is forced against such die by a resilient or elastic member, such as a large block of rubber. It has been found, however, that such molding methods have limitations and are not adapted to the manufacture of objects in dies designed to impart a large number of relatively sharp angles, embossed or depressed portions, or any appreciable number of relatively fine details. The prior method appears to be successful only in imparting gently curving contours to an object.

The present invention is particularly directed to methods whereby objects provided with a number of indentations, angles, depressions, lips, sharp curves and the like may be readily formed.

The method is applicable to the formation of objects not only from sheet material, such as aluminum, sheet copper and other metals or alloys, but is also applicable to the formation of objects from compositions such as thermosetting or thermoplastic compositions, laminated wood and fabric, etc.

Generally stated, the present invention pertains to a method whereby objects may be formed or molded by forcing an elastic member against a material in the direction of a die, such elastic member being preferably forced so as to compress the material by means of fluid pressure. The elastic member may be either unitary or preferably laminated, the laminations being movable relatively to each other so as to permit the outer layers of the elastic member more readily to conform to details of the die.

In order to cause plastic deformation of the material from which the object is being made, the method of the present invention employs fluid pressure impulses varying rapidly in intensity, the resulting pulsations causing the material being acted upon to flow into the cavities and other details of the die. By the use of a fluid pressure including the rapidly pulsating variable pressure component, plastic flow of metals is attained so that relatively intricate objects may be quickly and readily formed.

An object of the present invention, therefore, is to disclose and provide methods of facilitating molding and forming operations.

Another object is to disclose and provide means and methods whereby fluid pressure may be effectively employed in forming objects from various sheet metals, compositions, thermoplastics, laminated bodies, etc.

An object of the present invention is to disclose and provide a method whereby plastic flow and deformation of metals may be obtained by the use of a pulsating fluid pressure applied to a forming member.

These and other objects, uses and advantages of the invention will become apparent to those skilled in the art from the following detailed description of the invention and certain modifications thereof.

In order to facilitate understanding, reference will be had to the appended drawing, in which.

Figure 1:
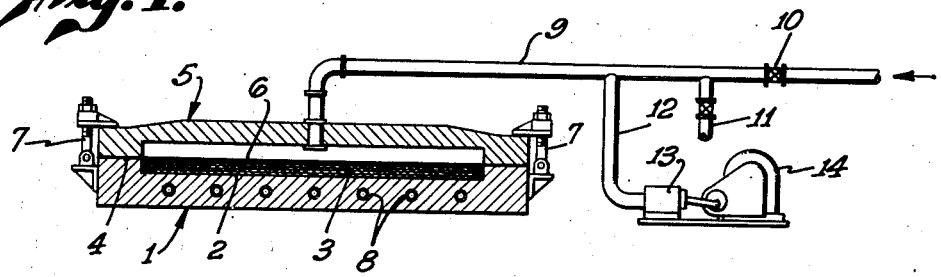
Fig. 1 is a sectional view, partly diagrammatic, of an arrangement which may be employed in the formation of objects from veneers bonded with suitable adhesives or plastics.

As previously stated, the methods and devices of the present invention are adapted for use with many compositions, materials and metals from which the final object is to be formed. Fig. 1 diagrammatically illustrates one phase of the invention as applied to the manufacture of a laminated sheet such as, for example, a sheet made of layers of wood veneer bonded by means of a resin, adhesive, thermoplastic or the like. The individual sheets of veneer may be individually impregnated or may be interlaid with sheets of adhesive or resin.

As shown in Fig. 1, the lower member or die 1 is provided with a smooth inner surface 2 upon which the various layers of veneer and bonding material are laid, these various layers being indicated at 3. The edges of the die 1 are raised to form a peripheral seating plane, indicated at 4. A cover 5 provided with a resilient or elastic member 6 is applied to the seating plane of the die 1 and firmly attached thereto by ring bolts or latches such as the latch 7. The resilient or elastic member 6 may be a thin sheet of steel or other metal and when the unit is first assembled, such resilient member 6 is in contact with the composition 3 being molded. Heating and cooling means, such as the coils 8, may be embedded with or made an integral part of the die 1.

Means are provided for supplying fluid pressure to the space between the resilient member 6 and the body of the cover 5, such as for example, a pipe line 9 leading to a source of fluid pressure, not shown. The fluid employed is preferably hot oil, water or other liquid and may be supplied from a suitable arrangement of heaters and pumps. A check valve 10 and a valved outlet line 11 are provided in the conduit 9.

In compressing the composition 3 into a coherent, strong sheet or object, fluid pressure is admitted through the conduit 9 into the space behind the resilient or elastic sheet 6 so as to force said sheet towards the die 1 and thereby compress the composition 3. Thermosetting or thermoplastic adhesives are used in the composition 3. Suitable heat is supplied by the use of hot liquids in the conduit 9 and by energizing the heating means 8. The fluid pressure is gradually increased, the resiliency and elasticity of the member 6 permitting such member to move downwardly toward the die and exert suitable pressure upon the composition 3. The rapidity with which consolidation of the composition 3 is attained is greatly accelerated by superimposing a pulsating higher pressure upon the fluid in conduit 9 and in the chamber behind the elastic member 6. This is accomplished by introducing a branch line 12 leading into the conduit 9, such branch line 12 being connected with a relatively short stroke, high speed pump or ram 13 driven by suitable gearing from a motor 14. The branch line 12 is, of course, filled with fluid and the rapid pulsations of the ram 13 generate fluid pressure impulses varying rapidly in intensity but becoming progressively higher as the pressure of the fluid supplied through check valve 10 becomes progressively higher. Differently stated, the ram 13 acts in a manner similar to that of a water hammer. Since liquids are relatively incompressible, the ram 13 materially increases the pressure within the conduit 9 and acting upon the elastic member 6, so that the elastic member 6 as well as the composition 3 is subjected to a progressively higher average pressure and to a multiplicity of blows resulting from the pulsating variable pressure component generated by the ram.

At the conclusion of a molding or forming operation, the valved branch line 11 is opened and the pressure existing in conduit 9 is released. The cover 5 is then removed and the molded object extracted from the die 1. It will be found that the fluid pressure, acting over the entire surface of the elastic member 6, has compacted the material 3 into an extremely dense object having contours identical with the surface 2 of the die 1.

Figure 2:
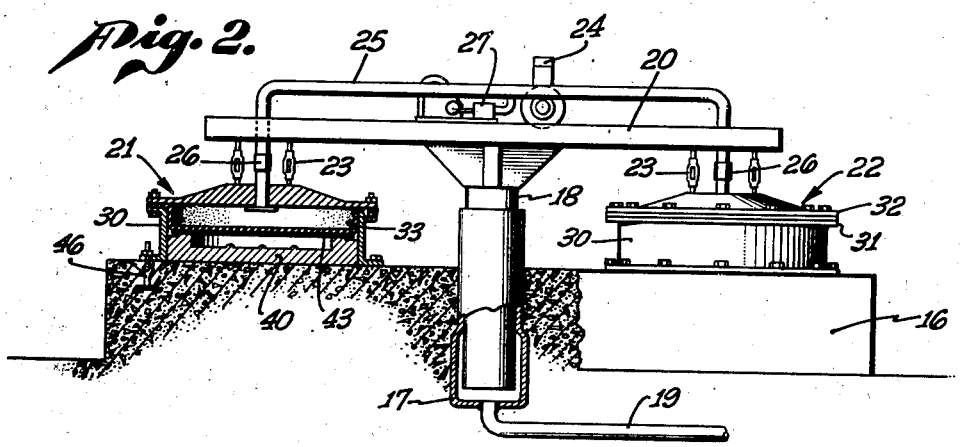
Fig. 2 is a vertical section of an improved type of machine adapted to perform a plurality of forming operations simultaneously.

By referring to Figs. 2 and 3, the adaptation of the method hereinabove described to the formation of objects from sheet metal, will be apparent. The machine shown in Fig. 2 is designed to pressure-form a plurality of sheets of metal into a plurality of objects of desired form. The machine may comprise a base or work table 16 of circular or polygonal plan. Centrally mounted is a pressure cylinder 17 with a ram 18 slidably mounted therein, means being provided, such as the conduit 19, for supplying fluid under pressure beneath the ram in order to raise the same. The ram 18 carries a superstructure or platform 20 above the level of the base 16 and a plurality of peripherally spaced pressure heads 21 and 22, and the like. These pressure heads may be removably attached to the platform 20 as by means of bolts and turnbuckles, generally indicated at 23. The platform 20 may also carry a suitable source of fluid pressure, such as the high pressure pump 24, the discharge of such pump being connected as by line 25 and suitable branch lines to each of the pressure heads. The pressure head 21, for example, may be connected to conduit 25 by means of a coupling 26. A rapidly reciprocating ram or pump 27 is connected to the conduit 25 for the purpose of superimposing a rapidly pulsating, regulatable pressure to the fluid in the conduit 25. It is to be understood that the conduit 25 may be provided with a check valve and a valved discharge line. The platform 20 may also carry a storage tank for fluid and a heater for the fluid if the use of heated fluid is deemed desirable.

Figure 3:
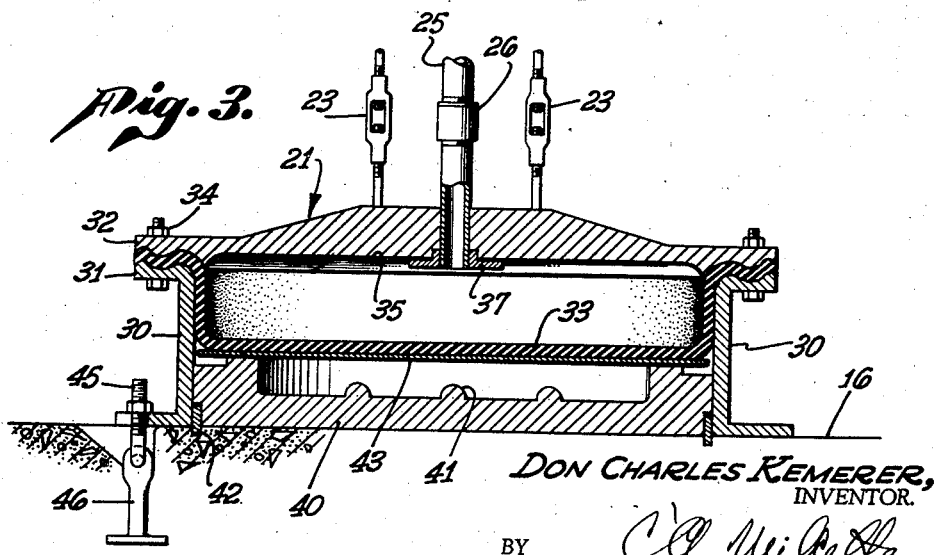
Fig. 3 is an enlarged vertical section through one of the forming units shown in Fig. 2.

As shown in greater detail in Fig. 3, the pressure head 21 (exemplary of the other pressure heads which may be embodied in the machine of Fig. 2) is provided with a centering cylinder 30 having an outwardly extending lip 31 having a corrugated upper surface complementary to the corrugations in the lower surface of the edge portion 32 of the pressure head 21. Held between these opposing corrugated surfaces of the lip 31 and edge area 32 is an elastic member 33, these opposing corrugated surfaces being firmly held as by means of bolts 34. For purposes of illustration, the elastic member 33 is shown as a unitary body which extends downwardly from the inner surface 35 of the pressure head 21 to form a sack or bag-like appendage. The conduit 25 is shown connected to the head 21 by means of a locking or gasketing ring 37.

A die 40 having a desired internal surface (shown provided with the inwardly extending rib-like projections 41) is positioned upon the work table 16. Positioning of the die 40 may be facilitated by the use of a removable centering ring 42 fitting into a recess formed in the surface of the table 16 and adapted to engage a centering die 40 immediately beneath the pressure head 21. After the die 40 has been properly positioned on the table 16, a sheet of metal from which the finished object is to be formed is placed within the die, as indicated at 43, and the ram 18 is lowered so as to lower the platform 20 and the pressure head 21 onto the die. The cylindrical ring 30 slidably fits around the die 40 and the lower flange of the ring 30 is locked to the table 16 as by means of the swing bolts 45, such swing bolts being anchored in the bed 16 as by anchors 46.

It is to be understood that four, six or even ten various dies may be mounted upon the table 16 so that the various operations described with respect to pressure head 21 and die 40 may be simultaneously taking place at various peripheral points of the bed 16. After the various pressure heads have been locked to the bed 16 above their respective dies, fluid is supplied to each of the pressure heads by means of the pump 24 and conduit 25. The fluid pressure existing within the sack or appendage formed by the elastic member 33 will cause such elastic member 33 to expand and force the sheet of metal 43 into intimate contact with the inner surfaces of the die 40.

It is to be understood that the pressure of fluid in conduit 25 increases at a desired rate and during such increase the ram 27 causes a rapid pulsation in such pressure so that a rapidly varying pressure of the fluid medium takes place while an effective, positive, fluid pressure is at all times maintained against the elastic member 33. The added pulsating pressure generated by the ram 27 causes the metal 43 to be drawn over the various ribs, such as 41, permitting the metal 43 to rapidly conform to the minutest differences in contour existing in the inner surface of the die 40. After a desired maximum pressure has been reached, the fluid pressure within the conduit 25 and pressure head 21 is released by discontinuing the pump 24 and opening a suitable discharge line associated with the conduit 25. The swing bolts 45 are released and the ram 18 is energized so as to raise all of the pressure heads simultaneously, thereby permitting formed objects to be withdrawn from the dies 40.

Although in the example given hereinabove the expansible member 33 was stated to be unitary, the expansible member 33 may be made of laminated structure and when so made the outer layer or material, adapted to come directly into contact with the metal being formed, should be relatively soft, elastic and resilient, whereas intermediate or other layers, although elastic, need not be as soft. By placing the softest layers in contact with the material being formed, greater accuracy and detail is attained. Flexible, impregnated cloth may be used for some of the layers in order to impart necessary strength to the expansible bag.

Those skilled in the art will appreciate that many variations of the present invention may be used. Numerous changes may be made in the arrangement and structure of the machines here disclosed. For example, the ram 18 may be operated hydraulically, pneumatically or even by mechanical means. The positioning ring 42 may be supplanted by registry pins or other means for properly positioning a die beneath the pressure head. Instead of the cylinder 38, other means for holding the head upon the bed 16 may be employed. The turnbuckles 23 permit leveling of the pressure head but other means for removably attaching pressure heads to the platform 20 may also be used.

The methods and processes of the present invention are particularly well adapted to the formation of objects from sheet metals. By the term "metals" as used herein, reference is made not only to pure metals such as aluminum, copper and the like, but to the many alloys available for industrial use, such as the aluminum-copper-magnesium-manganese alloys, aluminum-magnesium-silicon alloys, and various other alloys in which these and other metals appear in varying proportions. It may be noted that Duralumin and similar alloys may be most readily formed into desired objects if the forming operation is carried out within one or two hours of heat treatment. Those skilled in the art will appreciate that some alloys can be most easily worked at low temperatures and before hardening whereas others may be worked under different conditions. The fluid used in expanding the elastic member carried by the pressure head may be either hot or cold, depending upon the workability and physical characteristics of the metals being used. In some instances it may be desirable to equip the die 40 with either heating or cooling means so as to permit the forming operation to be carried out under optimum conditions.

All changes, modifications and adaptations coming within the scope of the appended claim are embraced thereby.

I claim:

A method of forming material into objects having the configuration of a die, which comprises: placing the material onto a die, covering the material with an elastic member, and forcing said elastic member against the material in the direction of the die by a gradually increasing average fluid pressure, said average fluid pressure including a rapidly pulsating variable pressure component.

DON CHARLES KEMERER.